(12) United States Patent
Sakaue

(10) Patent No.: US 11,167,700 B2
(45) Date of Patent: Nov. 9, 2021

(54) VEHICLE AUDIO SYSTEM

(71) Applicant: Toyota Jidosha Kabushiki Kaisha, Toyota (JP)

(72) Inventor: Tomoyasu Sakaue, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/954,449

(22) PCT Filed: Dec. 11, 2018

(86) PCT No.: PCT/JP2018/045507
§ 371 (c)(1),
(2) Date: Jun. 16, 2020

(87) PCT Pub. No.: WO2019/124165
PCT Pub. Date: Jun. 27, 2019

(65) Prior Publication Data
US 2021/0086704 A1 Mar. 25, 2021

(30) Foreign Application Priority Data

Dec. 18, 2017 (JP) .............................. JP2017-241851

(51) Int. Cl.
B60R 11/02 (2006.01)
H04R 3/12 (2006.01)
(Continued)

(52) U.S. Cl.
CPC ............ *B60R 11/0217* (2013.01); *H04R 3/12* (2013.01); *H04R 5/02* (2013.01); *H04S 7/302* (2013.01); *H04R 2499/13* (2013.01)

(58) Field of Classification Search
CPC ........ H04R 2499/13; H04R 3/12; H04R 5/02; B60R 11/0217; H04S 7/302
(Continued)

(56) References Cited

U.S. PATENT DOCUMENTS

2005/0135636 A1 6/2005 Putti et al.
2006/0034467 A1 2/2006 Sleboda et al.
(Continued)

FOREIGN PATENT DOCUMENTS

CN 101007522 A 8/2007
CN 101461256 A 6/2009
(Continued)

*Primary Examiner* — William A Jerez Lora
(74) *Attorney, Agent, or Firm* — Dinsmore & Shohl LLP

(57) ABSTRACT

A vehicle audio system includes a first driver's seat speaker, a second driver's seat speaker having a narrower directivity than the first driver's seat speaker, a first front passenger's seat speaker, a second front passenger's seat speaker having a narrower directivity than the first front passenger's seat speaker, and a delay processing unit that causes an audio signal output to the speaker out of the first driver's seat speaker and the second driver's seat speaker closest to the driver's seat to be delayed relative to an audio signal output to the speaker furthest from the driver's seat, and causes an audio signal output to the speaker out of the first front passenger's seat speaker and the second front passenger's seat speaker closest to the front passenger's seat to be delayed relative to an audio signal output to the speaker furthest from the front passenger's seat.

2 Claims, 9 Drawing Sheets

(51) Int. Cl.
*H04R 5/02* (2006.01)
*H04S 7/00* (2006.01)

(58) Field of Classification Search
USPC .......... 381/1, 5, 77, 80, 81, 85, 86, 89, 302
See application file for complete search history.

(56) References Cited

U.S. PATENT DOCUMENTS

| | | | |
|---|---|---|---|
| 2007/0116298 A1 | 5/2007 | Holmi et al. | |
| 2009/0262963 A1* | 10/2009 | Inoue | H04R 5/02 381/302 |
| 2012/0314889 A1* | 12/2012 | Mizuno | H04S 3/002 381/302 |

FOREIGN PATENT DOCUMENTS

| | | |
|---|---|---|
| EP | 1788838 A2 | 5/2007 |
| EP | 2023672 A1 | 2/2009 |
| JP | H05-199595 A | 8/1993 |
| JP | 2007-312081 A | 11/2007 |
| JP | 2007312081 * | 11/2007 |
| JP | 2009-260628 A | 11/2009 |
| JP | 2013-165387 A | 8/2013 |

* cited by examiner

VEHICLE AUDIO SYSTEM

CROSS-REFERENCE TO RELATED APPLICATIONS

The present application is the National Phase entry of International Patent Application No. PCT/JP2018/045507 filed on Dec. 11, 2018, which claims priority to Japanese Patent Application No. 2017-241851 filed Dec. 18, 2017, the entire contents of which are hereby incorporated by reference into this application.

TECHNICAL FIELD

The present disclosure relates to an audio system for a vehicle that is mounted in a vehicle and generates sound within a vehicle cabin.

BACKGROUND ART

An audio playback device has been proposed, for example, in Japanese Unexamined Patent Application (JP-A) No. 2009-260628 (Patent Document 1) in which a first speaker is installed on the right side of a center-front position of a driver's seat, a second speaker is installed on the left side of a center-front position of the driver's seat, a third speaker is installed on a right side of a center-front position of a front passenger's seat and on the left side of the second speaker, and a fourth speaker is installed on the left side of a center-front position of the front passenger's seat. Moreover, in Patent Document 1, a right-channel audio signal is supplied to the first speaker and second speaker, and a left-channel audio signal is supplied to the third speaker and fourth speaker. Low/mid frequency components of an addition signal of the right-channel audio signal and the left-channel audio signal are supplied to a subwoofer.

SUMMARY

Technical Problem

However, the second speaker on the left side of the driver's seat is close to the front passenger's seat, and when sound from the second speaker reaches an occupant of the front passenger's seat, the quality of the sound heard by the occupant of the front passenger's seat is affected, and it is not possible for a desired sound localization to be achieved. Accordingly, this facet of a vehicle audio system has considerable room for improvement.

The present disclosure was achieved in view of the above-described drawback and it is an object thereof to provide a vehicle audio system that enables a desired sound localization to be achieved.

Solution to the Problem

In order to achieve the above-described object, a first aspect of the present disclosure includes a first driver's seat speaker that is disposed in front of a driver's seat, facing towards the driver's seat, a second driver's seat speaker that is disposed at a side of a front passenger's seat in a vehicle width direction relative to the first driver's seat speaker in front of the driver's seat, that faces towards the driver's seat, and that has a narrower directivity than the first driver's seat speaker, a first front passenger's seat speaker that is disposed in front of a front passenger's seat, facing towards the front passenger's seat, a second front passenger's seat speaker that is disposed at a side of the driver's seat in a vehicle width direction relative to the first front passenger's seat speaker in front of the front passenger's seat, that faces towards the front passenger's seat, and that has a narrower directivity than the first front passenger's seat speaker, and a delay processing unit that causes an audio signal, which is output to whichever of the first driver's seat speaker or the second driver's seat speaker is closest to the driver's seat, to be delayed relative to an audio signal that is output to whichever of the first driver's seat speaker of the second driver's seat speaker is furthest from the driver's seat, and that causes an audio signal, which is output to whichever of the first front passenger's seat speaker or the second front passenger's seat speaker is closest to the front passenger's seat, to be delayed relative to an audio signal that is output to whichever of the first front passenger's seat speaker or the second front passenger's seat speaker is furthest from the front passenger's seat.

According to the above-described first aspect, a first driver's seat speaker is disposed in front of a driver's seat, facing towards the driver's seat, and a second driver's seat speaker is disposed at a side of a front passenger's seat in a vehicle width direction relative to the first driver's seat speaker in front of the driver's seat, and faces towards the driver's seat. This second driver's seat speaker has a narrower directivity than the first driver's seat speaker.

A first front passenger's seat speaker is disposed in front of a front passenger's seat, facing towards the front passenger's seat, and a second front passenger's seat speaker is disposed at a side of a driver's seat in the vehicle width direction relative to the first front passenger's seat speaker in front of the front passenger's seat, and faces towards the front passenger's seat. This second front passenger's seat speaker has a narrower directivity than the first front passenger's seat speaker.

In addition, a delay processing unit causes an audio signal, which is output to whichever of the first driver's seat speaker or the second driver's seat speaker is closest to the driver's seat, to be delayed relative to an audio signal that is output to whichever of the first driver's seat speaker or the second driver's seat speaker is furthest from the driver's seat, and that causes an audio signal, which is output to whichever of the first front passenger's seat speaker or the second front passenger's seat speaker is closest to the front passenger's seat, to be delayed relative to an audio signal that is output to whichever of the first front passenger's seat speaker or the second front passenger's seat speaker is furthest from the front passenger's seat. As a result, the time alignment is adjusted for both the driver's seat and the front passenger's seat, and it is possible for occupants of both seats to simultaneously enjoy audio that has superior sound localization. Moreover, by respectively narrowing the directivity of the two driver's seat speakers and the two front passenger's seat speakers, it is possible to inhibit the sound from spreading out and traveling in unintended directions. As a result, the timings at which both left and right sounds arrive can be made to coincide for each seat as is desired, and it becomes possible to achieve the desired sound localization.

A second aspect of the present disclosure includes a first right-side rear passenger's seat speaker that is disposed in front of a right-side rear passenger's seat, facing towards the right-side rear passenger's seat, a second right-side rear passenger's seat speaker that is disposed at a side of a left-side rear passenger's seat in a vehicle width direction relative to the first right-side rear passenger's seat speaker in front of the right-side rear passenger's seat, that faces towards the right-side rear passenger's seat, and that has a narrower directivity than the first right-side rear passenger's seat speaker, a first left-side rear passenger's seat speaker that is disposed in front of the left-side rear passenger's seat, facing towards the left-side rear passenger's seat, a second left-side rear passenger's seat speaker that is disposed at a side of the right-side rear passenger's seat in a vehicle width direction relative to the first left-side rear passenger's seat speaker in front of the left-side rear passenger's seat, that faces towards the left-side rear passenger's seat, and that has a narrower directivity than the first left-side rear passenger's seat speaker, and a delay processing unit that causes an audio signal, which is output to whichever of the first right-side rear passenger's seat speaker or the second right-side rear passenger's seat speaker is closest to the right-side rear passenger's seat, to be delayed relative to an audio signal that is output to whichever of the first right-side rear passenger's seat speaker or the second right-side rear passenger's seat speaker is furthest from the right-side rear passenger's seat, and that also causes an audio signal, which is output to whichever of the first left-side rear passenger's seat speaker or the second left-side rear passenger's seat speaker is closest to the left-side rear passenger's seat, to be delayed relative to an audio signal that is output to whichever of the first right-side rear passenger's seat speaker or the second right-side rear passenger's seat speaker is furthest from the left-side rear passenger's seat.

According to the above-described second aspect, a first right-side rear passenger's seat speaker is disposed in front of a right-side rear passenger's seat facing towards the right-side rear passenger's seat, and a second right-side rear passenger's seat speaker is disposed at a side of a left-side rear passenger's seat in a vehicle width direction relative to the first right-side rear passenger's seat speaker in front of the right-side rear passenger's seat, and that faces towards the right-side rear passenger's seat. This second right-side rear passenger's seat speaker has a narrower directivity than the first right-side rear passenger's seat speaker.

A first left-side rear passenger's seat speaker is disposed in front of the left-side rear passenger's seat, facing towards the left-side rear passenger's seat, and a second left-side rear passenger's seat speaker is disposed at a side of the right-side rear passenger's seat in a vehicle width direction relative to the first left-side rear passenger's seat speaker in front of the left-side rear passenger's seat, and faces towards the left-side rear passenger's seat. This second left-side rear passenger's seat speaker has a narrower directivity than the first left-side rear passenger's seat speaker.

In addition, a delay processing unit causes an audio signal, which is output to whichever of the first right-side rear passenger's seat speaker or the second right-side rear passenger's seat speaker is closest to the right-side rear passenger's seat, to be delayed relative to an audio signal that is output to whichever of the first right-side rear passenger's seat speaker or the second right-side rear passenger's seat speaker is furthest from the right-side rear passenger's seat, and that also causes an audio signal, which is output to whichever of the first left-side rear passenger's seat speaker or the second left-side rear passenger's seat speaker is closest to the left-side rear passenger's seat, to be delayed relative to an audio signal that is output to whichever of the first right-side rear passenger's seat speaker or the second right-side rear passenger's seat speaker is furthest from the left-side rear passenger's seat. As a result, the time alignment is adjusted for both the right-side rear passenger's seat and the left-side rear passenger's seat, and it is possible for occupants of both seats to simultaneously enjoy audio that has superior sound localization. Moreover, by respectively narrowing the directivity of the two right-side rear passenger's seat speakers and the two left-side rear passenger's seat speakers, it is possible to inhibit the sound from spreading out and traveling in unintended directions. As a result, the timings at which both left and right sounds arrive can be made to coincide for each seat as is desired, and it becomes possible to achieve the desired sound localization.

Note that, as in the case of a third aspect of the present disclosure, it is also possible for the first aspect of the present disclosure to further include a first rear speaker that is provided at a side of a front passenger's seat relative to a rear passenger's seat, a second rear speaker that is provided at a side of the driver's seat relative to a rear passenger's seat, a first switching unit that switches between an audio output from the second driver's seat speaker and an audio output from the first rear speaker, and a second switching unit that switches between an audio output from the second front passenger's seat speaker and an audio output from the second rear speaker.

Note also that, as in the case of a fourth aspect of the present disclosure, it is also possible for the first aspect of the present disclosure to further include a delay processing unit that causes an audio signal, which is output to whichever of the first driver's seat speaker or the second driver's seat speaker is closest to the driver's seat to be delayed relative to an audio signal that is output to the first rear speaker and to whichever of the first driver's seat speaker or the second driver's seat speaker is furthest from the driver's seat, and also causes an audio signal, which is output to whichever of the first front passenger's seat speaker or the second front passenger's seat speaker is closest to the front passenger's seat to be delayed relative to an audio signal that is output to the second rear speaker and to whichever of the first front passenger's seat speaker or the second front passenger's seat speaker is furthest from the front passenger's seat and to the second rear speaker.

According to the above-described present disclosure, the effect is obtained that it is possible to provide a vehicle audio system that enables a desired sound localization to be achieved.

DESCRIPTION OF THE EMBODIMENTS

Hereinafter, examples of exemplary embodiments of the present disclosure will be described in detail with reference to the drawings.

First Exemplary Embodiment

Figure 1:
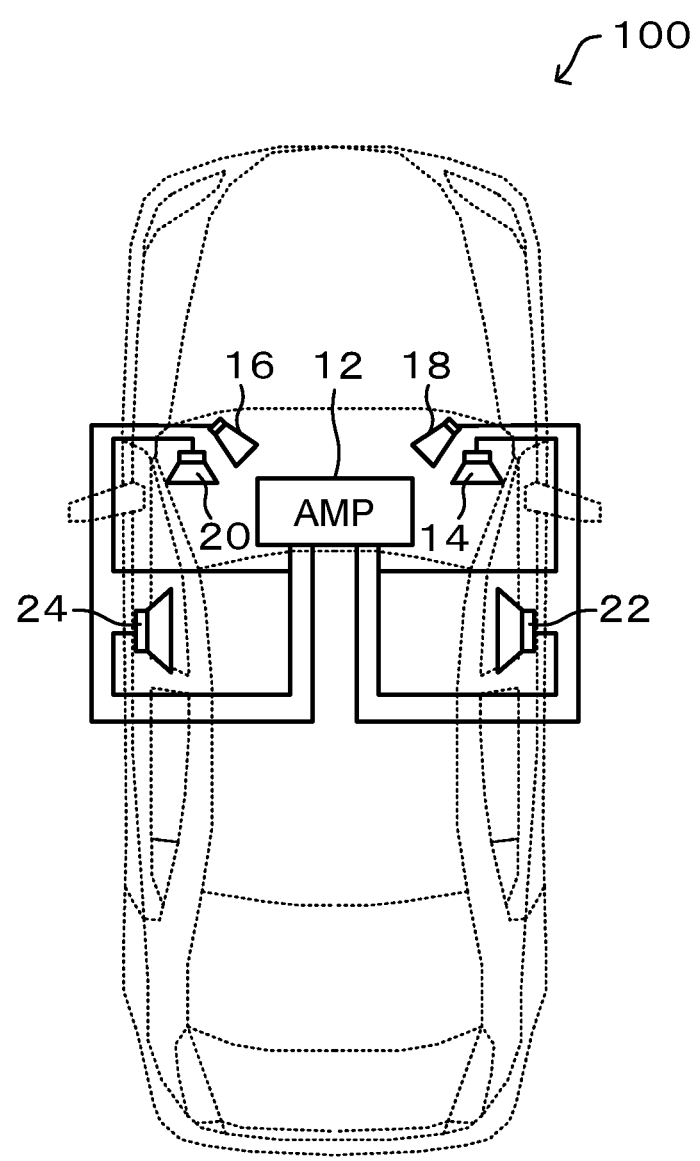
FIG. 1 is a view schematically showing vehicle mounting positions of a vehicle audio system according to a first exemplary embodiment.
Figure 2:
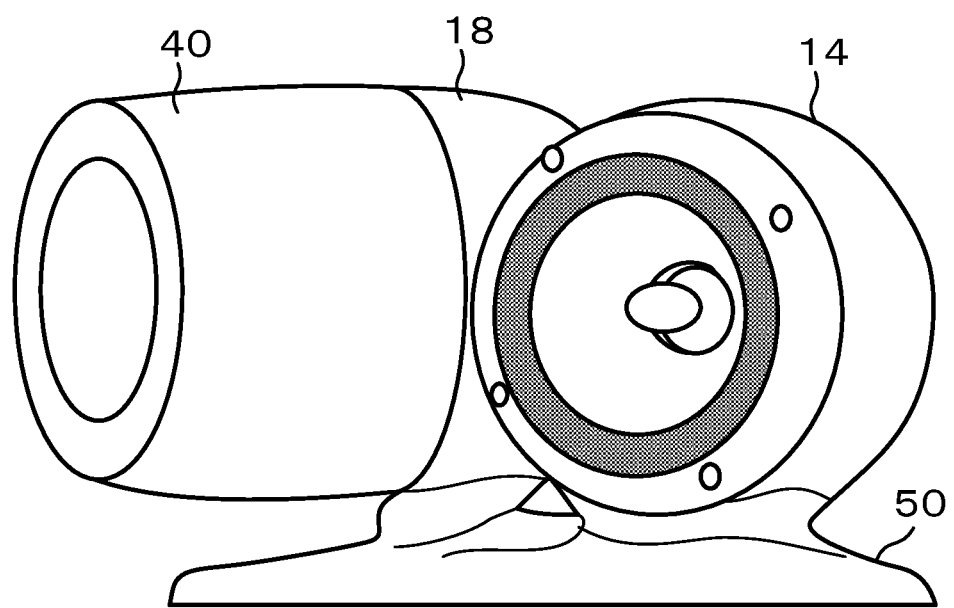
FIG. 2 is a view showing an example of an exterior appearance of tweeters of the vehicle audio system according to the first exemplary embodiment.
Figure 3:
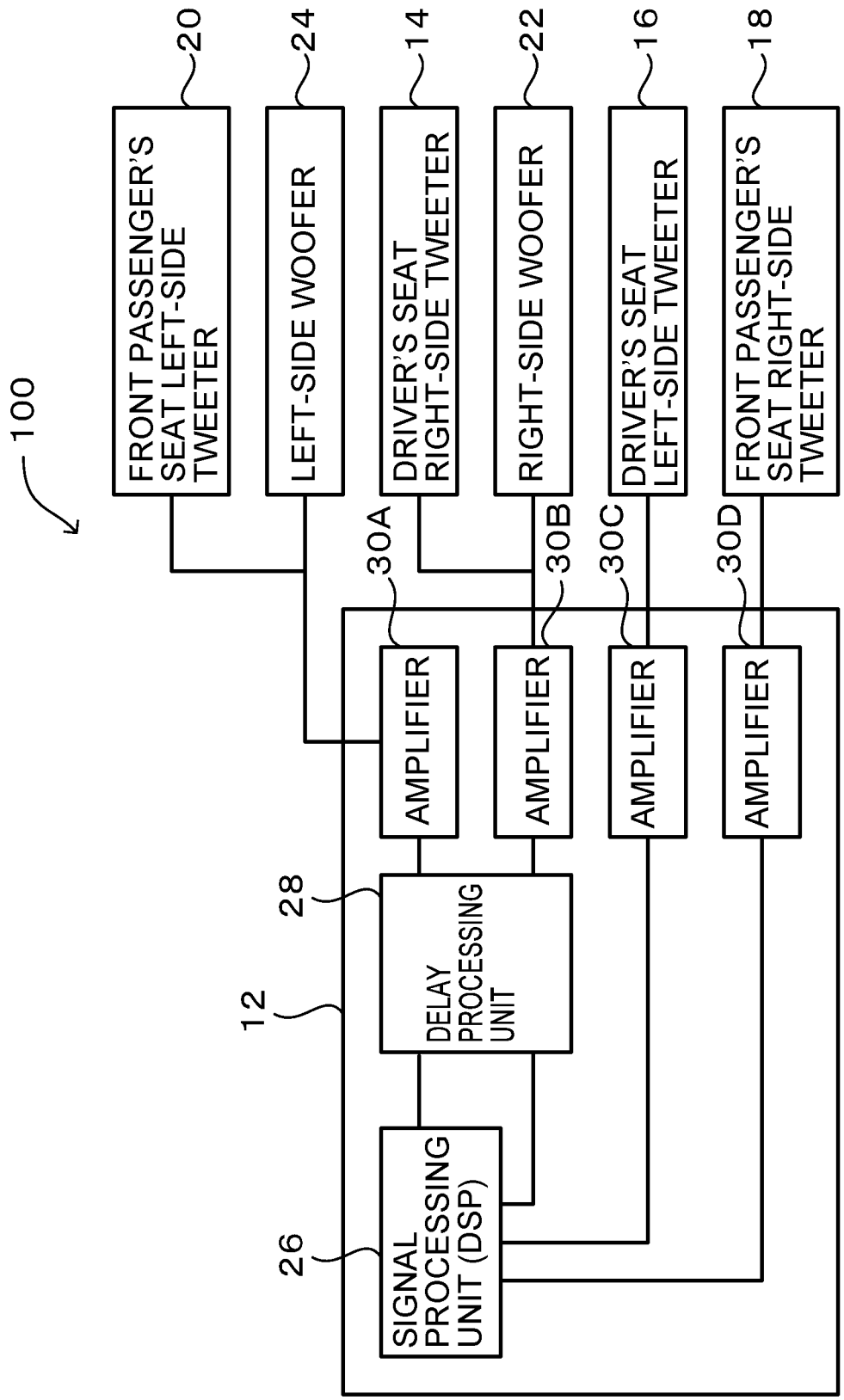
FIG. 3 is a block diagram showing a schematic structure of the vehicle audio system according to the first exemplary embodiment.

Firstly, a vehicle audio system according to a first exemplary embodiment will be described. FIG. 1 is a view schematically showing vehicle mounting positions of a vehicle audio system according to the present exemplary embodiment. FIG. 2 is a view showing an example of an exterior appearance of tweeters of the vehicle audio system according to the present exemplary embodiment. FIG. 3 is a block diagram showing a schematic structure of the vehicle audio system according to the present exemplary embodiment. Note that, in the present exemplary embodiment, a right-hand drive vehicle is used in the examples.

A vehicle audio system 100 according to the present exemplary embodiment is provided with an amp 12 that has at least four channels, a driver's seat right-side tweeter 14, a driver's seat left-side tweeter 16, a front passenger's seat right-side tweeter 18, a front passenger's seat left-side tweeter 20, a right-side woofer 22, and a left-side woofer 24.

The driver's seat right-side tweeter 14 corresponds to a first driver's seat speaker, and is disposed in front and on the right side of the driver's seat and facing towards the driver's seat. The driver's seat left-side tweeter 16 corresponds to a second driver's seat speaker, and is disposed in front and on the left side of the driver's seat (i.e., on the left front-side of the front passenger's seat) and facing towards the driver's seat. In other words, the driver's seat right-side tweeter 14 and the driver's seat left-side tweeter 16 are both disposed so that directional axes thereof face towards a vehicle occupant who is sitting in the driver's seat.

In contrast, the front passenger's seat right-side tweeter 18 corresponds to a second front passenger's seat speaker, and is disposed in front and on the right side of the driver's seat and on the left-side of the driver's seat right-side tweeter 14 so as to face towards the front passenger's seat. The front passenger's seat left-side tweeter 20 corresponds to a first front passenger's seat speaker, and is disposed in front and on the left side of the front passenger's seat and on the left-side of the driver's seat left-side tweeter 16 so as to face towards the front passenger's seat. In other words, the front passenger's seat right-side tweeter 18 and the front passenger's seat left-side tweeter 20 are both disposed so that directional axes thereof face towards a vehicle occupant who is sitting in the front passenger's seat.

The right-side woofer 22 is provided, for example, in a driver's seat door so as to face towards a vehicle cabin interior. The right-side woofer 22 is disposed so as to be further than the driver's seat right-side tweeter 14 from the right ear of the occupant of the driver's seat. In contrast, the left-side woofer 24 is provided in a front passenger's seat door so as to face towards a vehicle cabin interior. The left-side woofer 24 is disposed so as to be further than the front passenger's seat left-side tweeter 20 from the left ear of the occupant of the front passenger's seat. Note that, in the present exemplary embodiment, a crossover frequency between each tweeter and woofer is set at 2 kHz. However, depending on the crossover filter order between the respective tweeters and the volume difference between the woofers, it is still possible to obtain the effects of the present disclosure even if this crossover frequency is set outside 2 kHz. Because of this, the crossover frequency is not limited to 2 kHz, and may be set to another frequency.

As is shown in FIG. 2, a base surface 50 of the driver's seat right-side tweeter 14 and a base surface 50 of the front passenger's seat right-side tweeter 18 are integrally molded together so that these two tweeters are integrated into a single unit. In the same way, respective base surfaces of the driver's seat left-side tweeter 16 and the front passenger's seat left-side tweeter 20 are also integrally molded so that these two tweeters are integrated into a single unit. A cutoff frequency of a high-pass filter of each tweeter is in the vicinity of 2 kHz. Generally, the cutoff frequency of a tweeter is in the vicinity of 3 k to 5 kHz, however, by using a double tweeter and generating sound from the tweeters to a frequency that is closer to the base sound of a human voice and to a musical instrument, sound localization can be supported by the tweeters. In addition, if the directivities of the front passenger's seat right-side tweeter 18 and the driver's seat left-side tweeter 16 are not sufficiently narrow, then sound from the front passenger's seat right-side tweeter 18 reaches the driver's seat, and sound from the driver's seat left-side tweeter 16 reaches the front passenger's seat, so that sound localization is lost because of a sound precedence effect. Because of this, a sound pressure level having an average of −6 dB is obtained at 45 degrees relative to the directional axis.

Tweeters having a narrow directivity are used for both the front passenger's seat right-side tweeter 18 and the driver's seat left-side tweeter 16. More specifically, the same tweeter is used for both of these tweeters, however, as is shown in FIG. 2, by providing a horn component 40 having a narrow elongated shape on the front passenger's seat right-side tweeter 18 and the driver's seat left-side tweeter 16, they are provided with narrow directivity. Note that, in the present exemplary embodiment, from the viewpoint of ease of mounting in the front of the vehicle cabin interior, tweeters having a narrow elongated shape are used as the narrow-directivity speakers, however, the present disclosure is not limited to this. For example, it is also possible to employ narrow-directivity speakers that use array-type speakers or the like.

The right-side woofer 22 is provided in the driver's seat side door, while the left-side woofer 24 is provided in the front passenger's seat side door. Lower tone sounds are output from these woofers than from the respective tweeters.

In the present exemplary embodiment, the amp 12 provides four-channel output which is made up of two right-side channels and two left-side channels. More specifically, as is shown in FIG. 3, the amp 12 is provided with a signal processing unit 26, a delay processing unit 28, and four amplifiers 30A, 30B, 30C, and 30D. Note that unless it is necessary to distinguish between the individual amplifiers 30A, 30B, 30C, and 30D, they are referred to collectively as amplifiers 30.

The signal processing unit 26 functions as what is known as a DSP (Digital Signal Processor) and performs digital processing on audio signals such as, for example, performing processing to correct acoustic characteristics inside the vehicle cabin. In the present exemplary embodiment, the signal processing unit 26 outputs four-channel signals. Of these four channels, two channels are used to output post-processing audio signals to the delay processing unit 28, and the remaining two channels are used to output post-processing audio signals to the amplifiers 30C and 30D.

Figure 4:
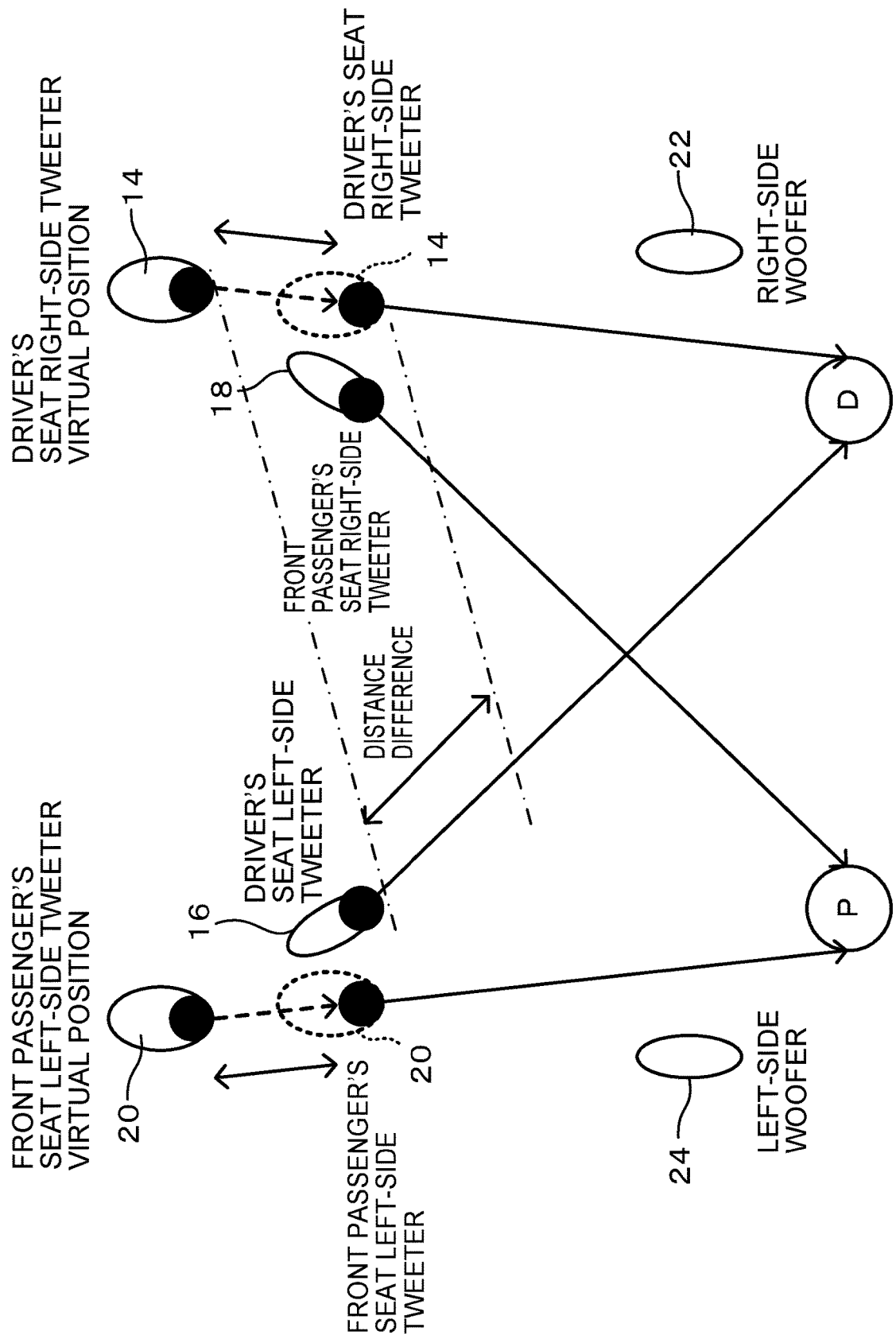
FIG. 4 is a view illustrating delay amounts in time alignments of a driver's seat and a front passenger's seat.

In order to adjust the time alignment and enable sound having superior localization to be heard by occupants of both the driver's seat and the front passenger's seat, the delay processing unit 28 delays the audio signals in two channels and then outputs these audio signals to the amplifiers 30A and 30B. In the present exemplary embodiment, because the driver's seat right-side tweeter 14 is closer to the driver's seat than is the driver's seat left-side tweeter 16, and the front passenger's seat left-side tweeter 20 is closer to the front passenger's seat than is the front passenger's seat right-side tweeter 18, the audio signals output to each of the driver's seat right-side tweeter 14 and the front passenger's seat left-side tweeter 20 are delayed. In other words, as is shown in FIG. 4, a delay whose delay amount corresponds to the difference between the distances to the left and right speakers for both the driver's seat and the front passenger's seat is attached to the respective audio signals. As a result, the distance from a respective occupant of each of the driver's seat and the front passenger's seat to their respective left and right tweeters are virtually adjusted to the same position. More specifically, for the driver's seat side, the delay amount corresponds to the difference between the distance from the driver's seat right-side tweeter 14 to the right ear of the occupant of the driver's seat, and the distance from the driver's seat left-side tweeter 16 to the left ear of the occupant of the driver's seat. On the other hand, for the front passenger's seat side, the delay amount corresponds to the difference between the distance from the front passenger's seat right-side tweeter 18 to the right ear of the occupant of the front passenger's seat, and the distance from the front passenger's seat left-side tweeter 20 to the left ear of the occupant of the front passenger's seat. Note that a previously set delay amount may be used for this delay amount. Alternatively, the delay amount may also be set manually.

The amplifier 30A is connected to the front passenger's seat left-side tweeter 20 and the left-side woofer 24. The amplifier 30A amplifies an audio signal, and outputs audio from each of the front passenger's seat left-side tweeter 20 and the left-side woofer 24.

The amplifier 30B is connected to the driver's seat right-side tweeter 14 and the right-side woofer 22. The amplifier 30B amplifies an audio signal, and outputs audio from each of the driver's seat right-side tweeter 14 and the right-side woofer 22.

The amplifier 30C is connected to the driver's seat left-side tweeter 16. The amplifier 30C amplifies an audio signal, and outputs audio from the driver's seat left-side tweeter 16.

The amplifier 30D is connected to the passenger's seat right-side tweeter 18. The amplifier 30D amplifies an audio signal, and outputs an audio signal from the passenger's seat right-side tweeter 18.

Note that outputs from the amplifier 30A and the amplifier 30C form the right-side channels, while outputs from the amplifier 30B and the amplifier 30D form the left-side channels.

Next, actions of the vehicle audio system 100 according to the present exemplary embodiment which is formed in the above-described manner will be described.

In the present exemplary embodiment, an audio signal that has been processed by the signal processing unit 26 is output in four channels. Two of these channels, namely, one left-side channel and one right-side channel are output to the delay processing unit 28, while the other two channels, namely, one left-side channel and one right-side channel are output respectively to the amplifiers 30C and 30D.

In the delay processing unit 28, delay processing is performed such that the distances from the driver's seat to the respective left and right tweeters thereof are the same and such that the distances from the front passenger's seat to the respective left and right tweeters thereof are the same, and a playback signal is then output to the amplifiers 30A and 30B.

Next, the playback signal is amplified in each amplifier 30A to 30D, and audio is generated from the speakers connected to the respective amplifiers 30A to 30D.

As a result, as is shown in FIG. 4, the audio output respectively from the driver's seat right-side tweeter 14 and the front passenger's seat left-side tweeter 20 is delayed, so that the distances from a seat occupant to the left and right speakers are made the same virtual distances.

In this way, by treating each tweeter as a separate channel, and executing time alignment, it is possible to achieve sound having superior localization in which the left and right phases match in both a driver's seat and a front passenger's seat.

Moreover, in the present exemplary embodiment, the directional axes of the driver's seat right-side tweeter 14 and the driver's seat left-side tweeter 16 are arranged so as to face towards an occupant of the driver's seat, while the directional axes of the front passenger's seat right-side tweeter 18 and the front passenger's seat left-side tweeter 20 are arranged so as to face towards an occupant of the front passenger's seat. As a result, a large number of direct sounds are able to reach the ears of the occupants, and a clear, vibrant sound can be provided to the occupants. Moreover, when considering the sound in both the driver's seat and the front passenger's seat, the speakers may be positioned symmetrically to the left and right, and for the driver's seat left-side tweeter 16 and the driver's seat right-side tweeter 14 to face directly towards the driver's seat, and for the front passenger's seat left-side tweeter 20 and the front passenger's seat right-side tweeter 18 to face directly towards the front passenger's seat. By employing this structure, sound having characteristically superior directional axes can be delivered to the ears of occupants of both the driver's seat and the front passenger's seat. Furthermore, if speakers whose directional axis is not directed towards a particular seat (for example, the front passenger's seat left-side tweeter 20 and the front passenger's seat right-side tweeter 18 relative to the driver's seat, and the driver's seat left-side tweeter 16 and the driver's seat right-side tweeter 14 relative to the front passenger's seat) deliver sound which does have a time difference to the ears of an occupant of that particular seat, then effects such as a concert hall acoustic effect can be achieved.

Moreover, by respectively disposing left and right speakers at the left end and right end of the front portion of the vehicle cabin interior, so as to widen the width direction between them, it is possible to enjoy a soundstage that extends to the very left and right edges of the vehicle cabin interior. Not only can music be enjoyed, but position information for stereo sound sources can be accurately played back on a wide sound stage. As a result, energetic and lively sound can be reproduced. Moreover, by placing four speakers inside two housings, the number of parts can be reduced thereby enabling costs to be curtailed.

Moreover, in the present exemplary embodiment, the crossover frequency between each tweeter and woofer is set at 2 kHz. This is because, if this crossover frequency is set lower than 2 kHz, then it is necessary for the tweeters to produce sound at a lower frequency, so that the size of the tweeters increases and forward visibility is deteriorated. In contrast, if the crossover frequency is set higher than 2 kHz, then localization is pulled to the left and right woofers, and it is no longer possible to listen to sound which has superior localization. Because the human ear has the characteristic of being more sensitive to high frequencies and less sensitive to low frequencies when recognizing the direction relative to which a sound is coming, if sound whose frequency exceeds 2 kHz is output from the left and right woofers, then the occupant recognizes the sound as being emitted by the left woofer or the right woofer. However, depending on the crossover filter order between the respective tweeters and the volume difference between the woofers, because it is still possible to obtain the effects of the present disclosure even if this crossover frequency is set outside 2 kHz, the crossover frequency is not limited to 2 kHz, and may be set to another frequency.

Moreover, in the present exemplary embodiment, because speakers are not installed directly in front of the driver, but compact speakers are instead installed at the left and right ends of the vehicle cabin interior, these speakers can be mounted in positions where they do not obstruct the field of view directly in front of the driver.

Furthermore, in the present exemplary embodiment, by providing the narrow elongated horn components 40 on the driver's seat left-side tweeter 16 and the front passenger's seat right-side tweeter 18 so that these tweeters are furnished with directivity, the sound is inhibited from spreading out and traveling in unintended directions. As a result, the timings at which both left and right sounds arrive can be made to coincide for each seat in the desired manner.

In addition, as a result of the delay processing unit 28 attaching a delay to the audio output from each of the driver's seat right-side tweeter 14 and the front passenger's seat left-side tweeter 20, the arrival timings when the left and right audio arrive at the occupants of each seat can be made to coincide. Moreover, because the distance to the right ear of an occupant of the driver's seat from the driver's seat right-side tweeter 14 is closer than the distance thereto from the driver's seat left-side tweeter 16, the existence of a door speaker is eliminated, and a genuine sound stage effect can be reproduced between the driver's seat left-side tweeter 16 and the driver's seat right-side tweeter 14. The same effect can be obtained for an occupant of the front passenger's seat as well by making the distance to the left ear of an occupant of the front passenger's seat to the front passenger's seat left-side tweeter 20 closer than the distance thereto from the front passenger's seat right-side tweeter 18.

In a conventional vehicle audio system, in settings that include a time alignment, sound having good localization is only achieved for the driver's seat, and an extremely unbalanced sound in which both the vocals and the instruments feel stuck to the speaker is generated in the left speaker for the front passenger's seat. In this case, it is not possible for friends or family members to enjoy music together while driving. Moreover, during a long drive this situation does not encourage an owner of a vehicle to switch with another driver and take a break by listening to music in the front passenger's seat. On the other hand, in settings that do not include a time alignment, sound having unbalanced localization is generated at the same level in both the driver's seat and the front passenger's seat.

In contrast to this, in the vehicle audio system according to the present exemplary embodiment, it is possible to achieve sound having superior localization in both the driver's seat and the front passenger's seat. As a result, friends or family members can enjoy music together from the same perspective (i.e., at the same level of sound localization and at the same quality) while driving, and the enjoyment of energetic and lively stereo sound sources can be shared with others.

Moreover, in the vehicle audio system 100 according to the present exemplary embodiment, because it is possible to achieve sound having superior localization simultaneously in both the driver's seat and the front passenger's seat, there is no need to firstly perform a localization alteration operation by switching the listening mode. As a consequence, the burden on a vehicle occupant of having to perform a switching operation can be relieved, and this also contributes to an improvement in safety.

Second Exemplary Embodiment

Figure 5:
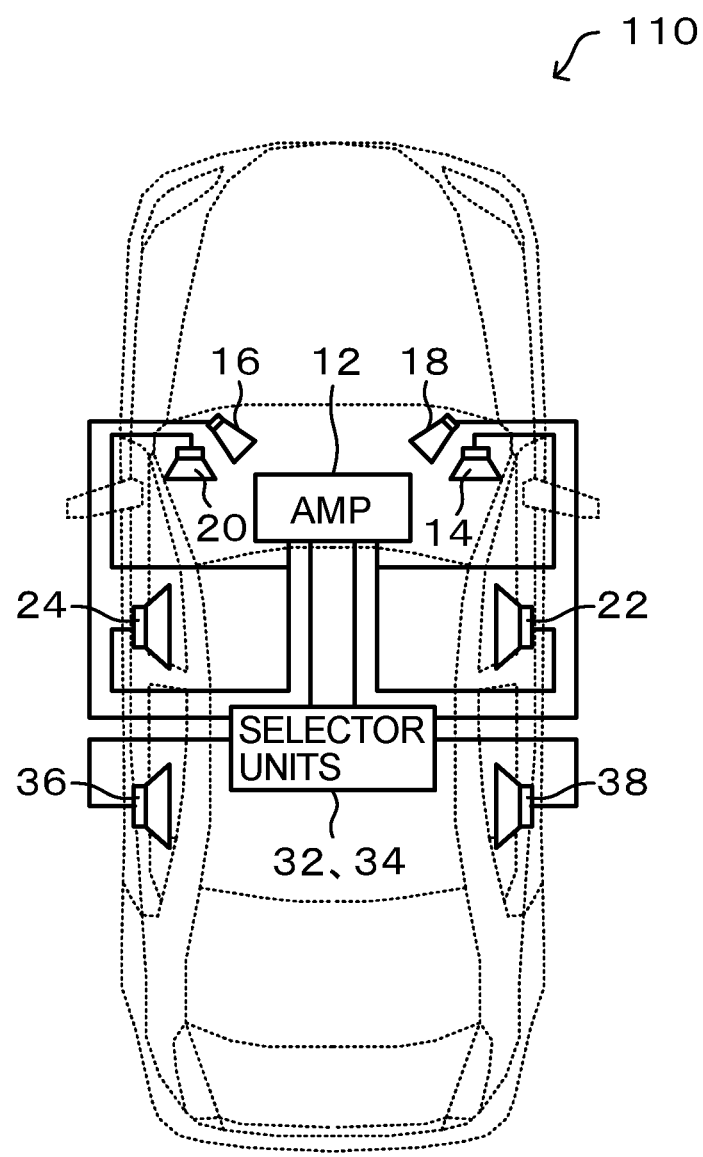
FIG. 5 is a view schematically showing vehicle mounting positions of a vehicle audio system according to a second exemplary embodiment.
Figure 6:
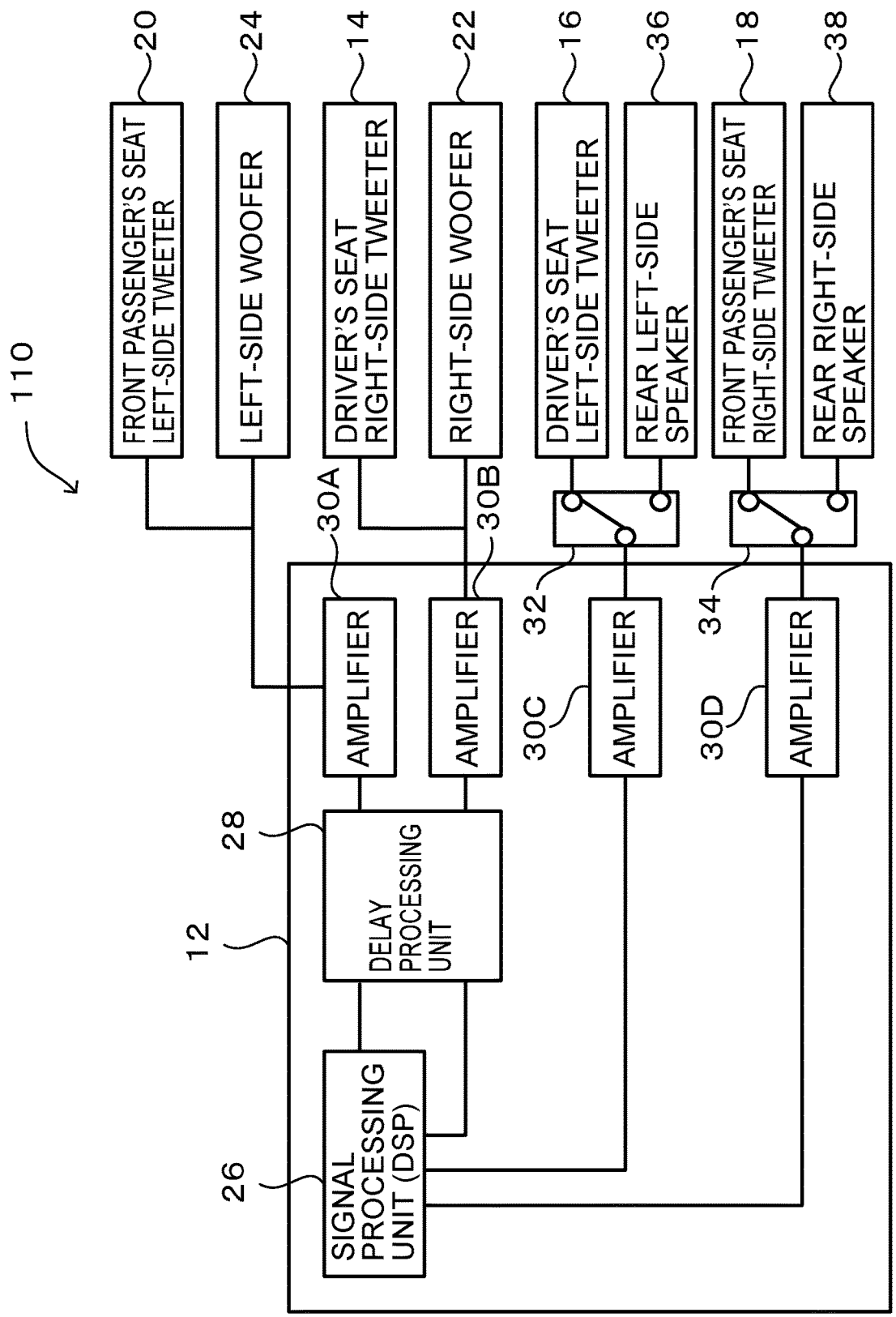
FIG. 6 is a block diagram showing a schematic structure of the vehicle audio system according to the second exemplary embodiment.

Next, a vehicle audio system according to a second exemplary embodiment will be described. FIG. 5 is a view schematically showing vehicle mounting positions of a vehicle audio system according to the present exemplary embodiment. FIG. 6 is a block diagram showing a schematic structure of the vehicle audio system according to the present exemplary embodiment. Note that, in the present exemplary embodiment, a right-hand drive vehicle is used in the examples. In addition, structure that is the same as in the first exemplary embodiment is described using the same descriptive symbols.

As is shown in FIG. 5 and FIG. 6, in the same way as the first exemplary embodiment, a vehicle audio system 110 according to the present exemplary embodiment is provided with a four-channel amp 12. However, the present exemplary embodiment differs from the first exemplary embodiment in that there are further provided two selector units 32 and 34, a rear left-side speaker 36 which serves as a first rear speaker, and a rear right-side speaker 38 which serves as a second rear speaker. Because remaining portions of the present exemplary embodiment are the same, only the aforementioned different portions will be described.

The selector unit 32 which serves as a first switching unit is connected between the amplifier 30C and the driver's seat left-side tweeter 16. The selector unit 34 is connected between the amplifier 30D and the front passenger's seat right-side tweeter 18.

In addition, the rear left-side speaker 36 is connected to the selector unit 32. An output destination of audio signals can be switched by the selector unit 32 between the driver's seat left-side tweeter 16 and the rear left-side speaker 36.

Furthermore, the rear right-side speaker 38 is connected to the selector unit 34 which serves as a second switching unit. An output destination of audio signals output can be switched by the selector unit 34 between the front passenger's seat right-side tweeter 18 and the rear right-side speaker 38.

The switching operations performed by the selector units 32 and 34 may be implemented by operating a switch or the like, or may be implemented automatically when an occupant sits in a rear seat or the like.

By employing the above-described structure, it is possible to obtain the same effects as those obtained from the first exemplary embodiment by switching the selector unit 32 to the driver's seat left-side tweeter 16 and the selector unit 34 to the front passenger's seat right-side tweeter 18.

Moreover, by switching the selector unit 32 to the rear left-side speaker 36 and the selector unit 34 to the rear seat right-side speaker 38 so that sound is emitted from both the front and rear of the vehicle by the respective front and rear channels, a feeling of being enveloped in sound, such as that experienced in a concert hall, becomes possible. Additionally, it is also possible to generate audio at a satisfactory volume level in the rear seats as well.

Note that the switching operations performed by the selector units 32 and 34 of the vehicle audio system 110 according to the present exemplary embodiment may be implemented by operating a switch or the like, or may be implemented in accordance with the result of a detection made by a sensor that is provided in order to detect whether an occupant is sitting in a rear seat.

Third Exemplary Embodiment

Figure 7:
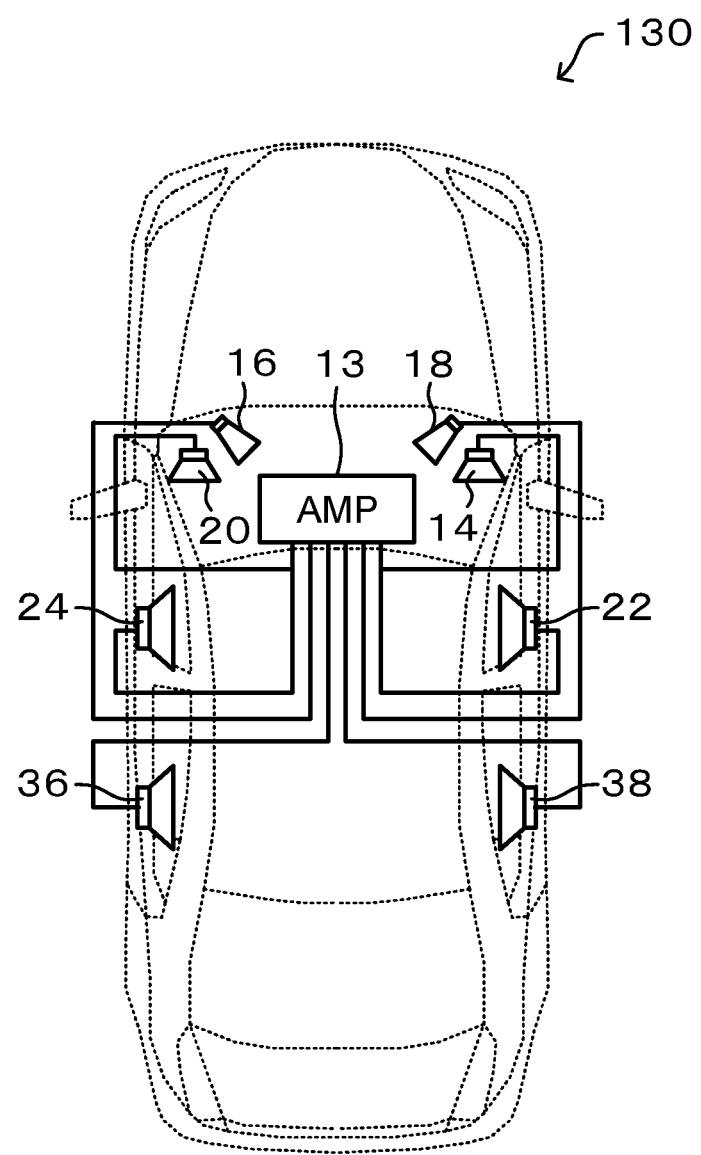
FIG. 7 is a view schematically showing vehicle mounting positions of a vehicle audio system according to a third exemplary embodiment.
Figure 8:
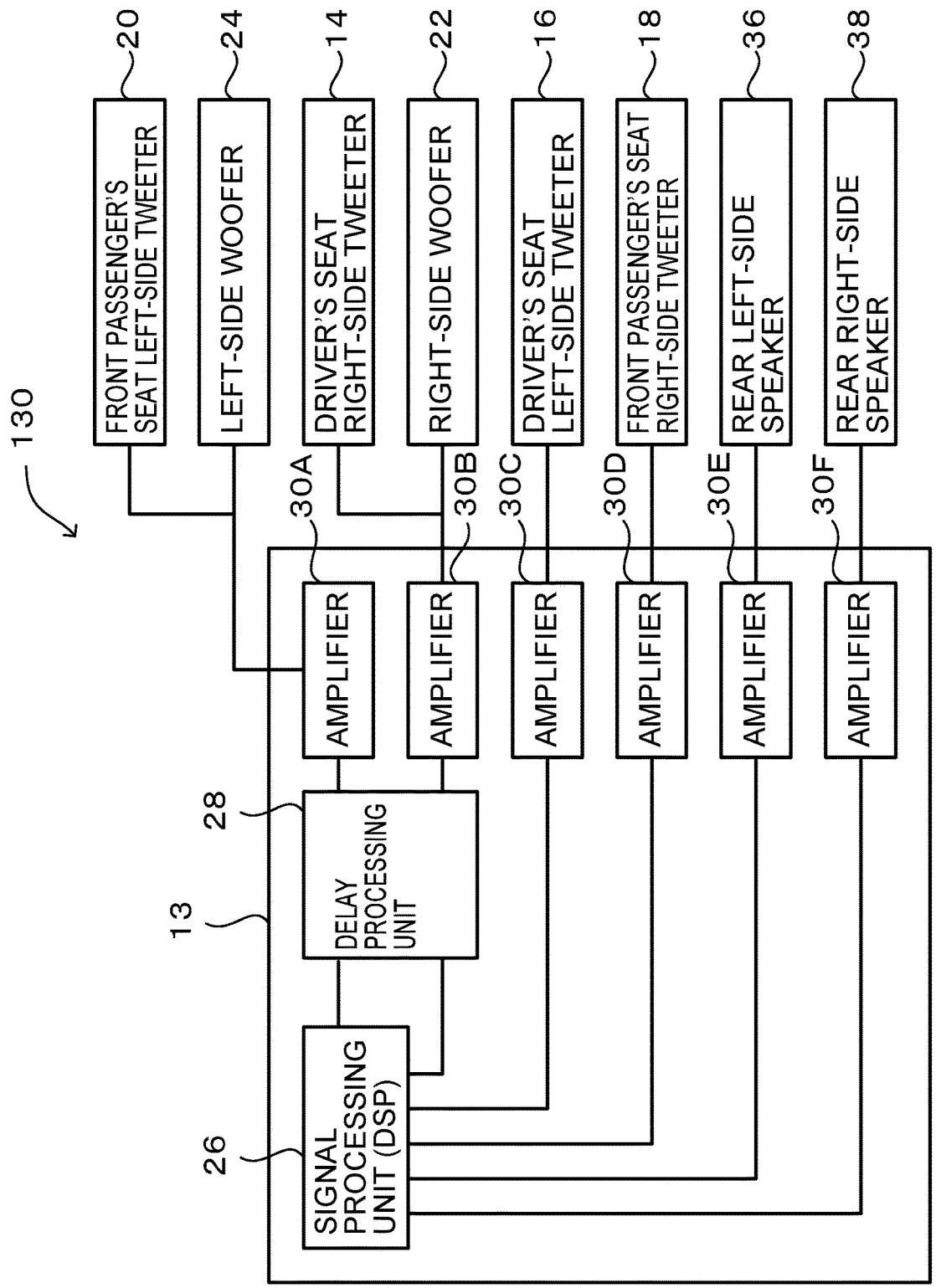
FIG. 8 is a block diagram showing a schematic structure of the vehicle audio system according to the third exemplary embodiment.

Next, a vehicle audio system according to a third exemplary embodiment will be described. FIG. 7 is a view schematically showing vehicle mounting positions of a vehicle audio system according to the present exemplary embodiment. FIG. 8 is a block diagram showing a schematic structure of the vehicle audio system according to the present exemplary embodiment. Note that, in the present exemplary embodiment, a right-hand drive vehicle is used in the examples. In addition, structure that is the same as in the first exemplary embodiment is described using the same descriptive symbols.

The second exemplary embodiment differs from the first exemplary embodiment in being further provided with the two selector units 32 and 34, the rear left-side speaker 36, and the rear right-side speaker 38. However, in the present exemplary embodiment, instead of the two selector units 32 and 34 of the second exemplary embodiment, there is instead provided a six-channel amp 13. In other words, in the second exemplary embodiment, sound can only be output exclusively from either the tweeters (i.e., the driver's seat left-side tweeter 16 and the front passenger's seat right-side tweeter 18) or the rear speakers (i.e., the rear left-side speaker 36 and the rear right-side speaker 38). However, in the present exemplary embodiment, sound can be output from both the tweeters and the rear speakers (i.e., the rear left-side speaker 36 which serves as the first rear speaker, and the rear right-side speaker 38 which serves as the second rear speaker).

More specifically, an amp that, compared to the amp 12 of the vehicle audio system 100 according to the first exemplary embodiment, is further provided with amplifiers 30E and 30F is used as the six-channel amp 13 of a vehicle audio system 130 according to the present exemplary embodiment. The amplifier 30E is connected to the rear left-side speaker 36 as a left channel, while the amplifier 30F is connected to the right-side speaker 38 as a right channel.

By employing the above-described structure, it is possible to generate sound in both the front and rear of a vehicle via two front channels and two rear channels, without having to perform switching using the selector units 32 and 34.

Note that, in the above-described exemplary embodiments, a structure is described in which a single delay processing circuit or a single delay processing unit 28 is provided for two channels, however, the present disclosure is not limited to this and it is also possible for a delay processing circuit or a delay processing unit 28 to be provided for each channel. In addition, although one delay processing circuit or one delay processing unit 28 is provided for two channels, it is instead possible to employ a structure in which one delay processing circuit or one delay processing unit 28 is provided respectively for all of the channels, so that the delay amount can be adjusted for each channel.

Moreover, the processing performed by the signal processing unit 26 and the delay processing unit 28 in the above-described exemplary embodiments may be software processing that is performed as a result of a program being executed, or may be processing that is performed by hardware. Alternatively, the processing may be performed via a combination of both software and hardware. If software processing is employed, then the relevant program may be stored on various types of storage medium and distributed.

Figure 9:
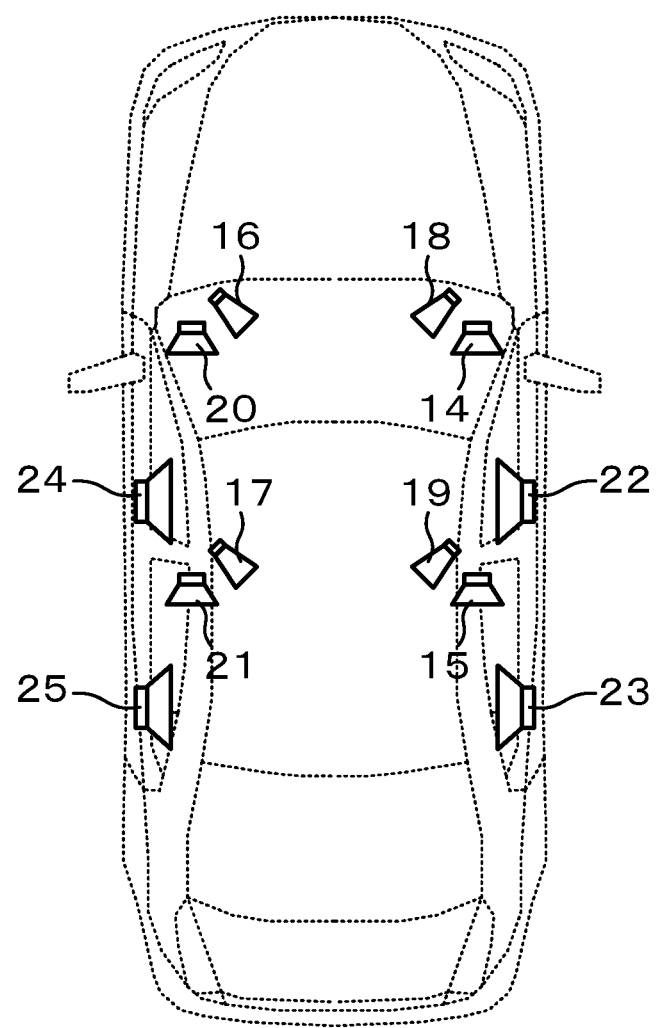
FIG. 9 is a view showing an example in which a driver's seat rear portion right-side tweeter, a driver's seat rear portion left-side tweeter, a front passenger's seat rear portion right-side tweeter, a front passenger's seat rear portion left-side tweeter, a rear portion right-side woofer, and a rear portion left-side woofer are further provided for rear seat passengers.

Furthermore, the present disclosure is not limited to the above description, and naturally various modifications and the like may be made to the above description (such as repositioning the driver's seat to the rear seat right side or the front passenger's seat to the rear seat left side and the like) insofar as they do not depart from the spirit or scope of the present disclosure. For example, the structure of the first exemplary embodiment may also be provided for the rear seats. In other words, as is shown in FIG. 9, it is possible to also further provide a driver's seat rear portion right-side tweeter 15 which serves as a first right-side rear passenger's seat speaker, a driver's seat rear portion left-side tweeter 17 which serves as a second right-side rear passenger's seat speaker, a front passenger's seat rear portion right-side tweeter 19 which serves as a second left-side rear passenger's seat speaker, a front passenger's seat rear portion left-side tweeter 21 which serves as a first left-side rear passenger's seat speaker, a rear portion right-side woofer 23, and a rear portion left-side woofer 25 for the rear passenger seats, and perform delay processing in the same way as for the front seats (i.e., as in the first exemplary embodiment). Alternatively, it is also possible to employ a structure in which only the driver's seat rear portion right-side tweeter 15, the driver's seat rear portion left-side tweeter 17, the front passenger's seat rear portion right-side tweeter 19, the front passenger's seat rear portion left-side tweeter 21, the rear portion right-side woofer 23, and the rear portion left-side woofer 25 are provided. Note that the driver's seat rear portion right-side tweeter 15, the driver's seat rear portion left-side tweeter 17, the front passenger's seat rear portion right-side tweeter 19, and the front passenger's seat rear portion left-side tweeter 21 may each be mounted in a roof lining, a driver's seat, and a front passenger's seat, or in a B Pillar between a front door and a rear door. The rear portion right-side woofer 23 and the rear portion left-side woofer 25 may be mounted in the vicinity of the rear door.

The invention claimed is:

1. A vehicle audio system, comprising:
    a first driver's seat speaker that is disposed in front of a driver's seat, facing towards the driver's seat;
    a second driver's seat speaker that is disposed at a side of a front passenger's seat in a vehicle width direction relative to the first driver's seat speaker in front of the driver's seat, that faces towards the driver's seat, and that has a narrower directivity than the first driver's seat speaker;
    a first front passenger's seat speaker that is disposed in front of the front passenger's seat, facing towards the front passenger's seat;
    a first rear speaker that is provided at a side of the front passenger's seat relative to a rear passenger's seat;
    a second rear speaker that is provided at a side of the driver's seat relative to the rear passenger's seat;

a first switching unit that switches between an audio output from the second driver's seat speaker and an audio output from the first rear speaker;

a second switching unit that switches between an audio output from the second front passenger's seat speaker and an audio output from the second rear speaker; and a delay processing unit that causes an audio signal, which is output to whichever of the first driver's seat speaker or the second driver's seat speaker is closest to the driver's seat, to be delayed relative to an audio signal that is output to whichever of the first driver's seat speaker or the second driver's seat speaker is furthest from the driver's seat, and that causes an audio signal, which is output to whichever of the first front passenger's seat speaker or the second front passenger's seat speaker is closest to the front passenger's seat, to be delayed relative to an audio signal that is output to whichever of the first front passenger's seat speaker or the second front passenger's seat speaker is furthest from the front passenger's seat.

2. The vehicle audio system according to claim 1, wherein the first switching unit and the second switching unit switch in accordance with a result of a detection made by a sensor.

* * * * *